Figure 9:
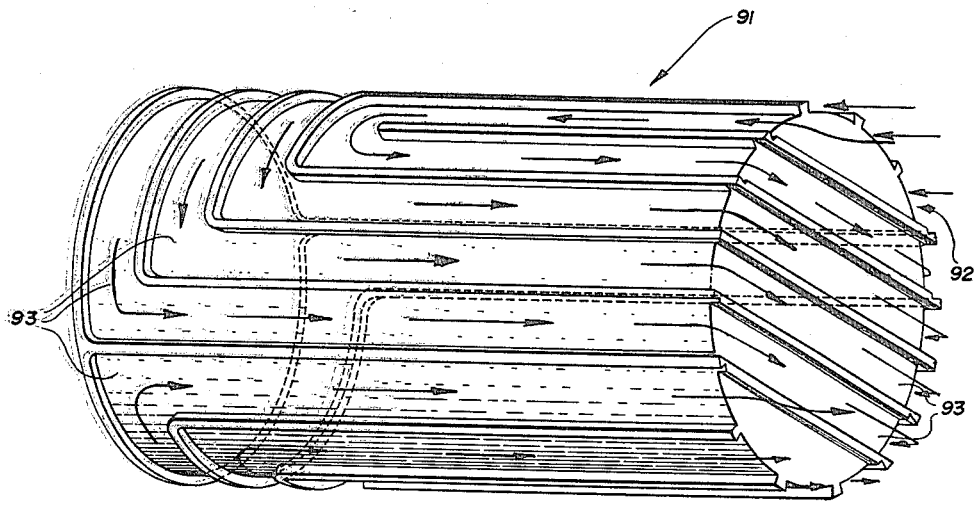

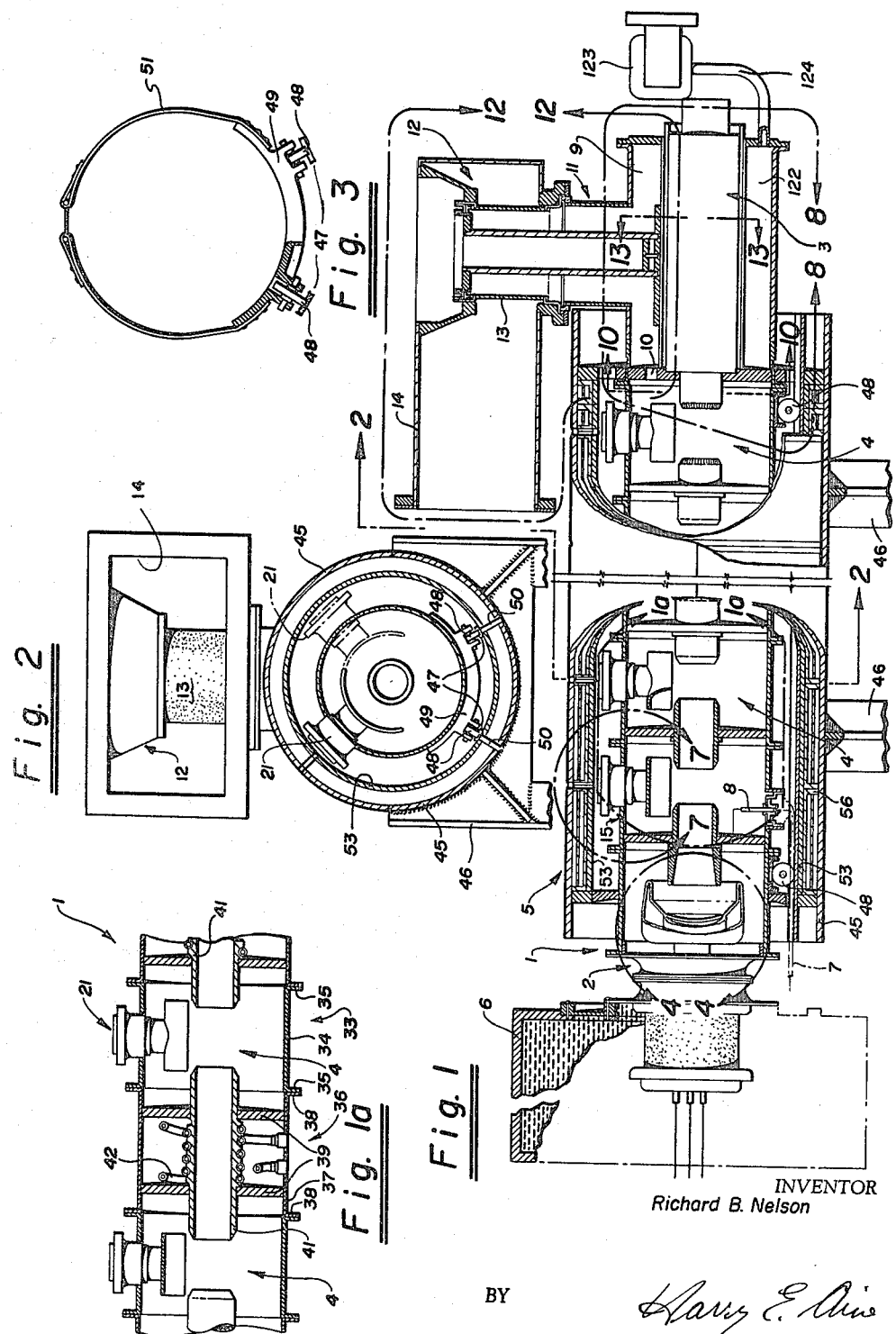

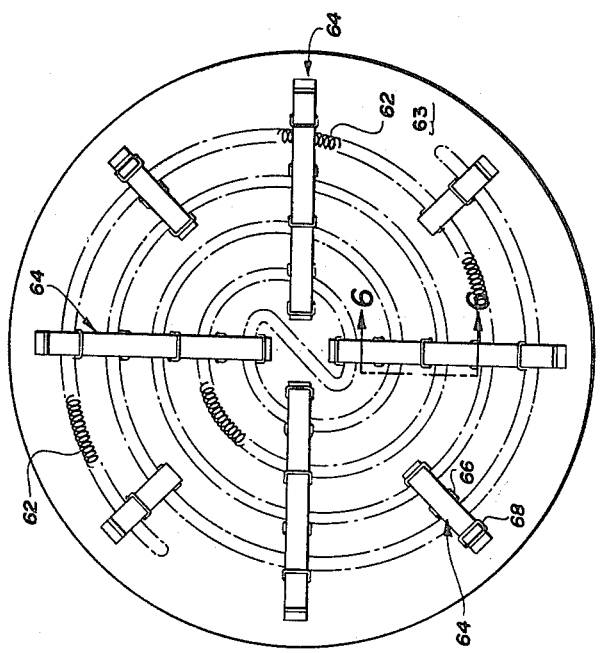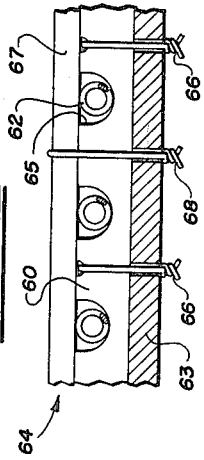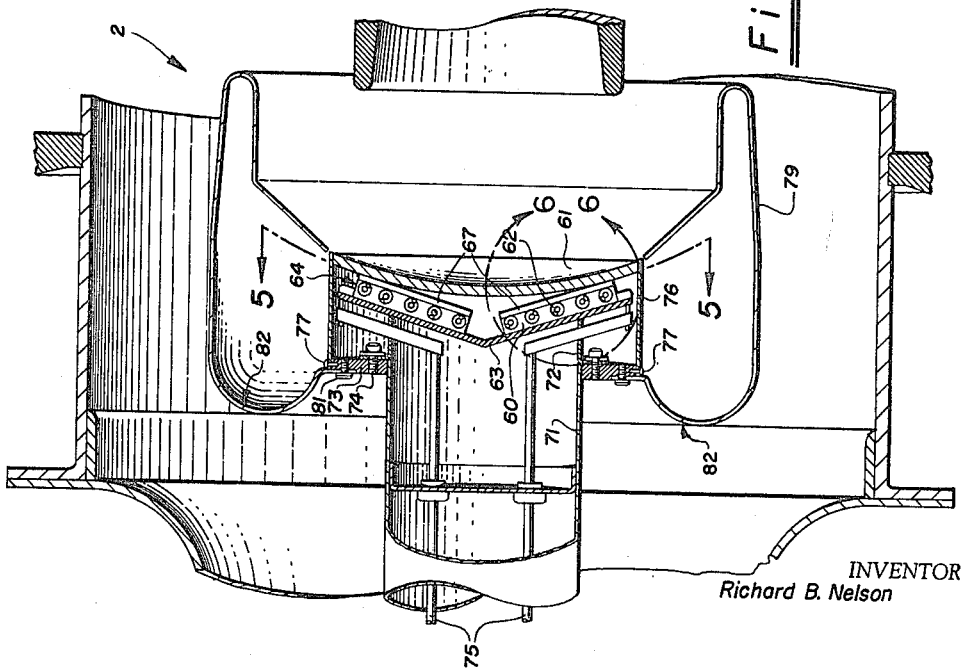

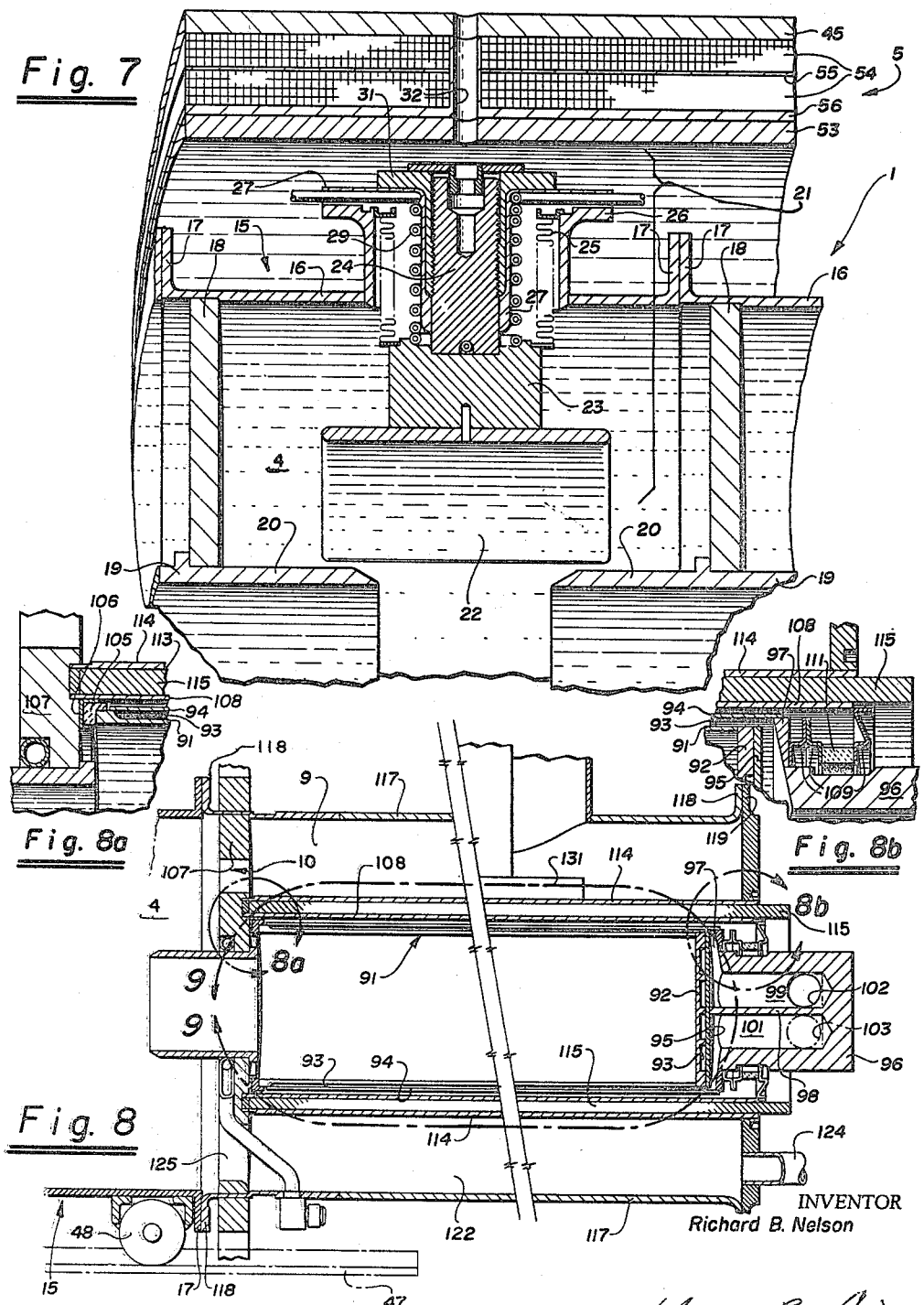

INVENTOR
Richard B. Nelson

BY *Harry E. Aine*

ATTORNEY

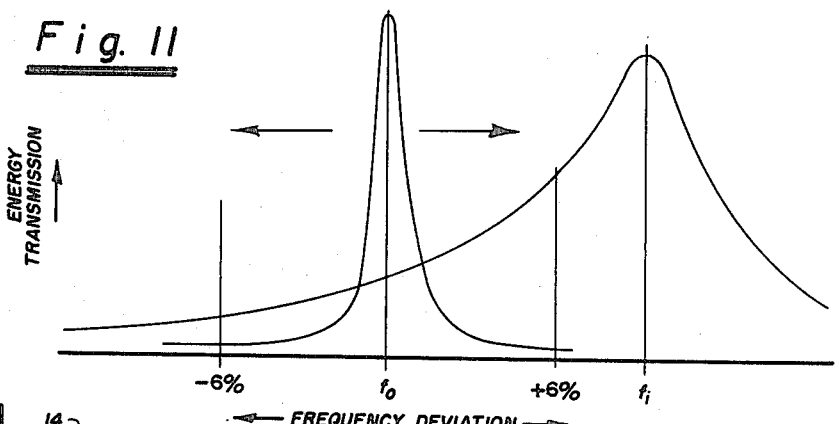
Fig. 11
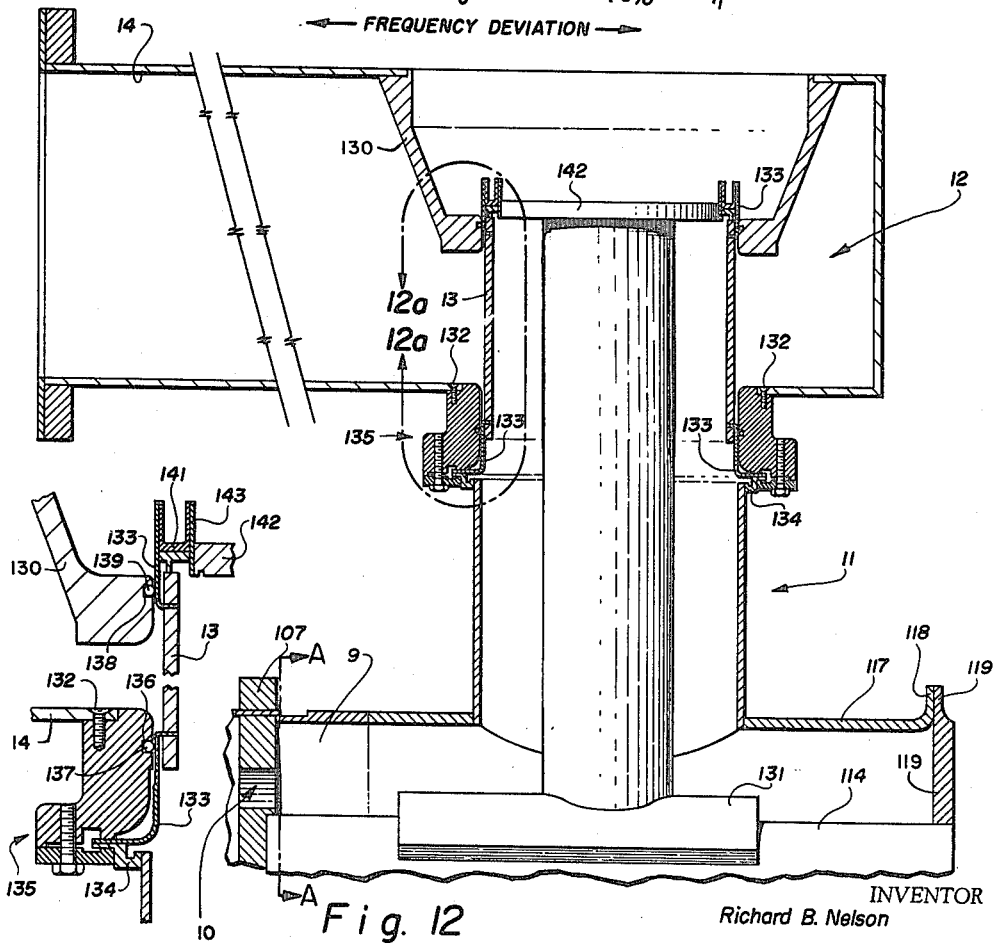
Fig. 12
Fig. 12a

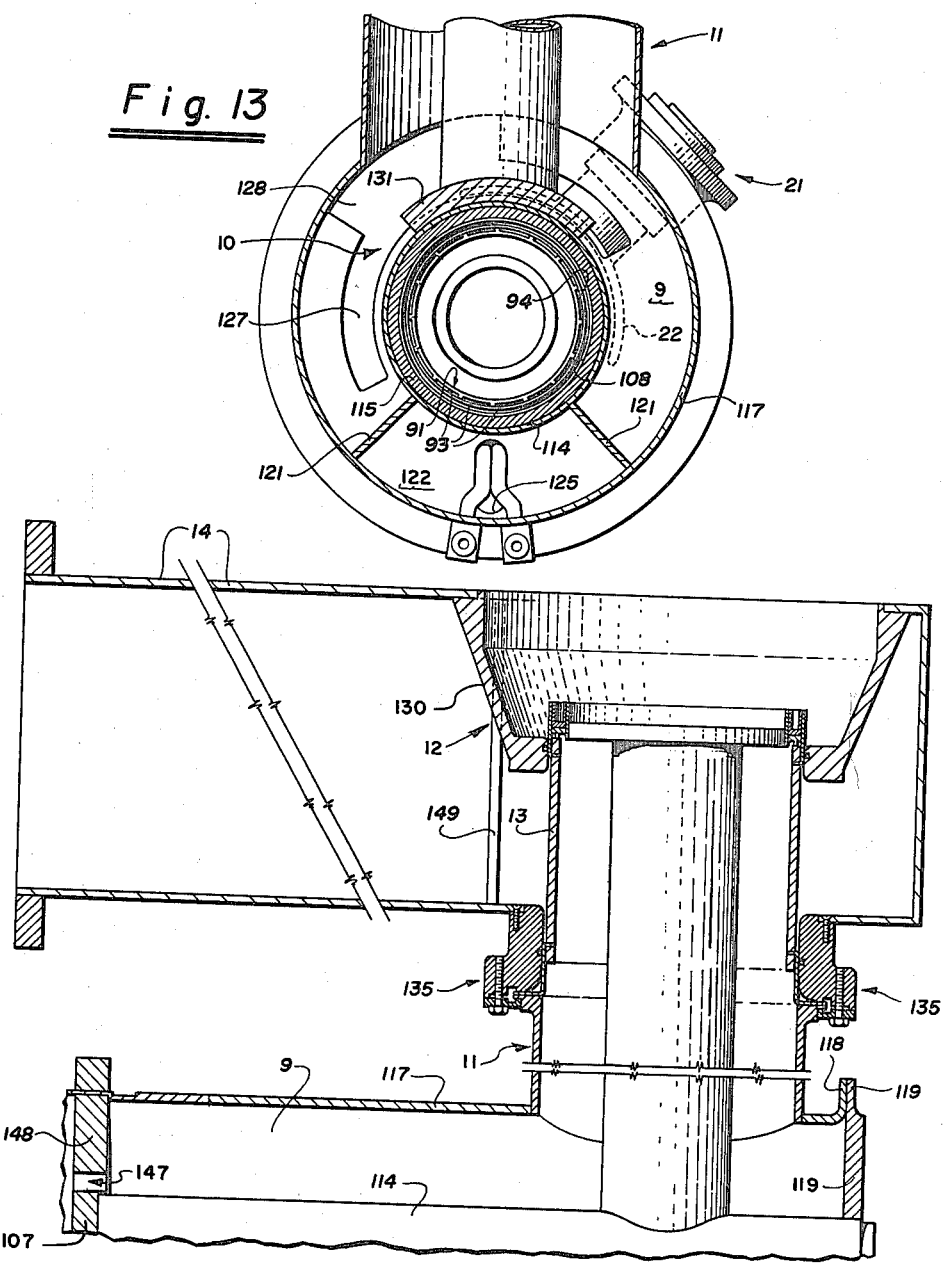

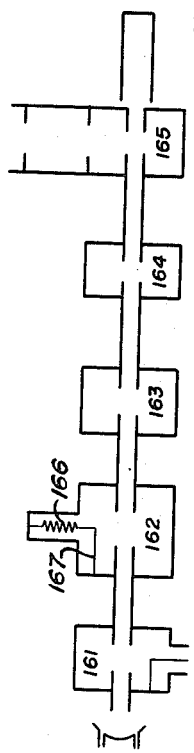
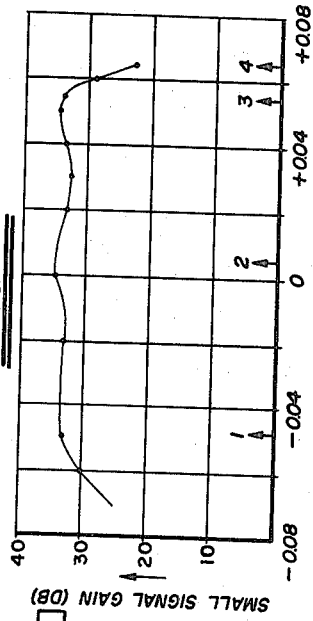
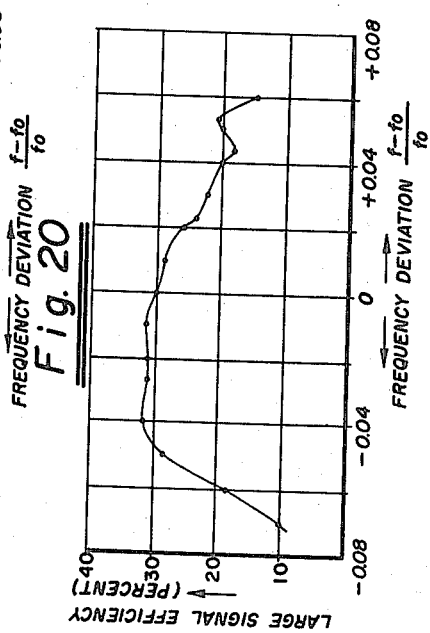
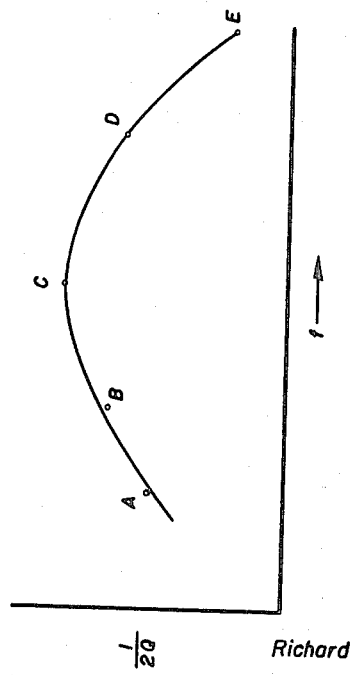

United States Patent Office 3,169,206
Patented Feb. 9, 1965

3,169,206
HIGH FREQUENCY TUBE METHOD AND APPARATUS
Richard B. Nelson, Los Altos, Calif., assignor to Varian Associates, Palo Alto, Calif., a corporation of California
Filed Aug. 6, 1959, Ser. No. 832,402
10 Claims. (Cl. 315—5.39)

The present invention relates in general to high frequency tubes and more particularly to a novel high power, pulsed, U.H.F., broad band amplifier useful, for example, in applications as navigation and communication systems, as a driver for a linear accelerator, and the like.

The present invention encompasses two models of the novel high frequency high power klystron amplifier. The first model comprises a U.H.F. seven cavity variably tuned klystron amplifier having a 45% R.F. efficiency and providing a 3% one-half power bandwidth tunable over a 12% full power range. This tube is approximately nine feet long and including only the evacuated structure weighs approximately seven hundred pounds. The tube will deliver 8 megawatts peak R.F. energy with an average power of approximately 30 kw.

The other tube is a fixed tuned five cavity U.H.F. klystron amplifier having a half power bandwidth of approximately 12% to 14% with an R.F. efficiency of 32%. This tube is approximately eleven feet in length and including only the evacuated structure weighs approximately 700 pounds. The tube will deliver at U.H.F. frequency 8 to 10 megawatts peak R.F. power with an average R.F. power of 30 kw.

The principal object of the present invention is to provide an improved high frequency klystron amplifier tube apparatus which is relatively simple of construction, relatively easy to handle, and which will have long operating life while delivering high peak and high average R.F. power.

One feature of the present invention is the provision of a tubular segmented modular vacuum envelope which is assembled by welding together a plurality of similar modules at successive mating flanges. In this manner a strong tube is obtained which is easy to construct and replacement of defective parts facilitated.

Another feature of the present invention is the provision of a horizontal tube mounting structure wherein the multicavity klystron amplifier is received within a horizontally mounted focus solenoid via the intermediary of wheels and mating tracks whereby handling and replacement of relatively large klystron amplifier tubes as well as tuning of the tube is facilitated.

Another feature of the present invention is the provision of a cylindrical X-ray shield disposed circumscribing the tube and disposed between the tube and the beam focus solenoid whereby the total weight of X-ray shielding is minimized as well as construction of the beam focus solenoid is facilitated since the electrical wiring and fluid coolant channels necessary, for the beam focus solenoid, do not have to pass through the X-ray shielding.

Another feature of the present invention is the provision of a simplified electron gun assembly having an easily replaceable electrostatic self-shielding focus electrode assembly whereby assembly and replacement of worn out or defective parts of the gun assembly are facilitated.

Figure 10:
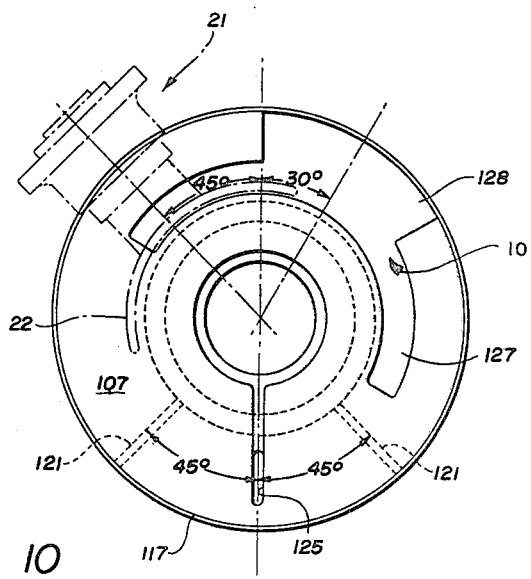
Figure 15:
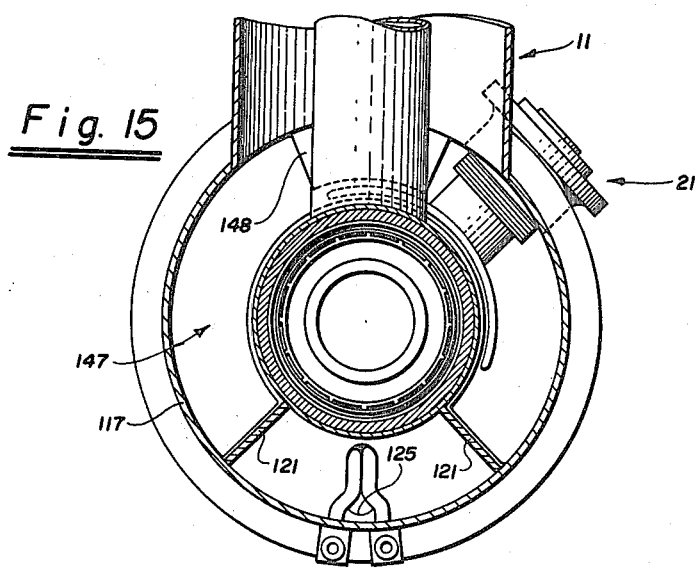
Figure 16:
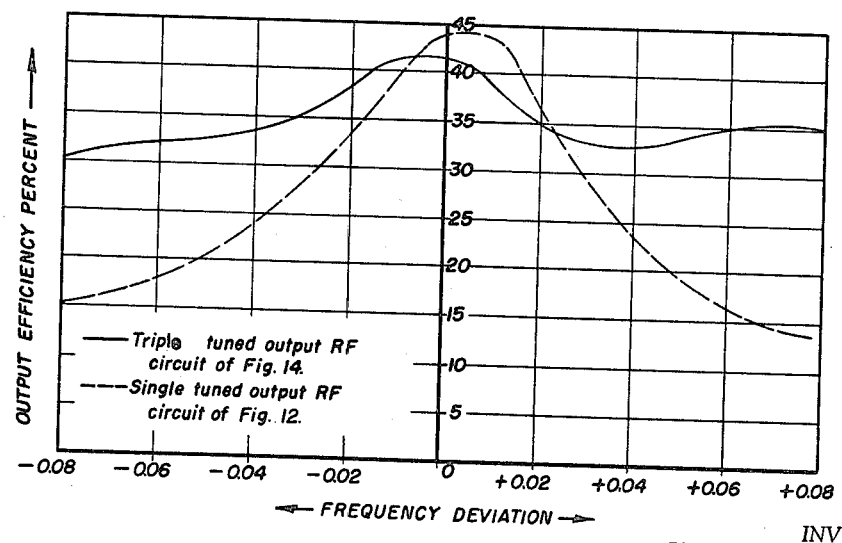

Other features and advantages of the present invention will become apparent upon a perusal of the following specification taken in connection with the accompanying drawings wherein, FIG. 1 is a longitudinal view, partly in section, showing the multicavity klystron amplifier apparatus of the present invention, FIG. 1a is an enlarged cross sectional view of an alternative embodiment of a portion of the structure of FIG. 1 delineated by line 1a—1a, FIG. 2 is a cross sectional view of the structure of FIG. 1 taken along line 2—2 in the direction of the arrows, FIG. 3 is an enlarged detail view of the clamp, wheel and track portion of the structure of FIG. 2, FIG. 4 is an enlarged cross sectional view of a portion of the structure of FIG. 1 delineated by line 4—4, FIG. 5 is an enlarged view of a portion of the structure of FIG. 4 taken along 5—5 in the direction of the arrows, FIG. 6 is an enlarged view, partly in section, of a portion of the structure of FIG. 5 taken along the line 6—6 in the direction of the arrows, FIG. 7 is an enlarged view, partly in cross section, of a portion of the structure of FIG. 1 delineated by line 7—7, FIG. 8 is an enlarged foreshortened view of a portion of the structure of FIG. 1 delineated by line 8—8, FIG. 8a is an enlarged cross section view of a portion of the structure of FIG. 8 delineated by line 8a—8a, FIG. 8b is an enlarged cross sectional view of a portion of the structure of FIG. 8 delineated by line 8b—8b, FIG. 9 is a detail perspective view of a portion of the structure of FIG. 8, delineated by line 9—9, FIG. 10 is an enlarged cross sectional view of a portion of the structure of FIG. 1 taken along line 10—10 in the direction of the arrows, FIG. 11 is a typical graph of energy transmission versus frequency deviation for the coupling structure shown in FIG. 10, FIG. 12 is an enlarged cross sectional view of a portion of the structure of FIG. 1 delineated by line 12—12, FIG. 12a is an enlarged foreshortened view of a portion of the structure of FIG. 12 delineated by the line 12a—12a, FIG. 13 is an enlarged cross sectional view of a portion of the structure of FIG. 1 taken along line 13—13 in the direction of the arrows, FIG. 14 is an enlarged cross sectional view of an alternative embodiment of the same portion of the structure of FIG. 1 as delineated by line 12—12, FIG. 15 is an enlarged cross sectional view of an alternative embodiment of the structure of FIG. 1 taken along a line the same as 13—13 in the direction of the arrows, FIG. 16 is a graph of output efficiency in percent versus frequency deviation for the klystron amplifier tube apparatus of FIG. 1 utilizing the alternative embodiment structures shown in FIGS. 14 and 15, FIG. 17 is a schematic diagram of a fixed tuned broadband klystron amplifier of the present invention depicting the preferential loading of the cavities, FIG. 18 is a graph of the reciprocal of cavity loading versus frequency for the klystron amplifier of FIG. 17, FIG. 19 is a graph of small signal gain versus frequency deviation of a broad band klystron amplifier tube apparatus of FIG. 17, and FIG. 20 is a graph of large signal efficiency in percent versus frequency deviation for the fixed tuned broad band klystron apparatus as depicted in FIG. 17.

Referring now to FIG. 1 there is shown a longitudinal partly cross sectional view of a high frequency high power multicavity klystron tube apparatus utilizing features of the present invention. More specifically, the tube comprises an elongated tubular metallic envelope 1 having an electron gun assembly 2 at one end thereof for producing and directing the beam of electrons axially through the elongated vacuum envelope 1 to an electron collector assembly 3 mounted at the other end of the elongated envelope 1. A plurality of cavity resonators 4 are provided between the cathode assembly 2 and the collector assembly 3 for successive electromagnetic interaction with the beam of electrons passable therethrough.

A beam focusing solenoid 5 envelopes the central portion of the tube's envelope for focusing the electron beam throughout the length of the tube apparatus. The free end portion of the cathode assembly 2 is inserted within an oil tank 6 and sealed therewithin via suitable mating flanges provided on the tube envelope 1 and the oil tank 6. The oil in the oil tank serves to prevent electrical breakdown across the high voltage anode to cathode insulator of the cathode assembly 2.

Electromagnetic energy which it is desired to have amplified by the tube is fed to the first cavity 4 of the tube via coaxial line 7 and input loop 8. This R.F. energy serves to velocity modulate the beam, such velocity modulation being transformed into current density modulation as the beam travels down the length of the tube. The current density modulation is further enhanced by successive cavities 4. The current density modulation serves to excite the last or output cavity 4. The greatly amplified R.F. output energy is extracted from the output cavity 4 via a suitable coupling iris 10 and hollow waveguide 9. The waveguide 9 is wrapped around the collector assembly 3. The output R.F. energy is extracted from the waveguide 9 via a coaxial line 11 and thence fed via a doorknob transition 12, having a cylindrical wave permeable window 13 vacuum sealed therein, to an output rectangular waveguide 14.

The modular tubular envelope feature of the present invention can best be seen in FIGS. 1 and 7. The midsection of the tubular vacuum envelope 1 is made up of a plurality of tubular modules 15 each comprising a hollow cylindrical member 16 as of, for example, stainless steel serving both as the outer vacuum envelope and the sidewall of the cavity resonator 4. Outwardly directed flange members 17 as of, for example, stainless steel, are provided at the ends of the cylindrical member 16 for mating with adjacent similar flange members 17 carried from adjacent modules 15. The mating flanges 17 are sealed together in a vacuum tight manner as by, for example, welding at the periphery thereof.

In one embodiment of the present invention individual modules 15 are similar in the midsection of the tube each including a transversely disposed annular cavity header 18 as of, for example, copper brazed at its outside periphery to the inside surface of the cylindrical member 16. A tubular drift tube segment 19 is carried transversely from the annular header 18 from the inside periphery of its central opening as by, for example, brazing. When the modules 15 are assembled, the drift tube segments 19 are in axial alignment and the interior spaces between successive cavity headers 18 define the cavity resonators 4 having spaced apart re-entrant drift tube portions 20 therein defining therebetween tthe electromagnetic gap of the cavity 4.

Each module 15 includes a capacitive cavity tuner assembly 21 (see FIG. 7) which extends into each of the cavity resonators 4 through an aperture in the tubular member 16. The tuner assembly 21 is of predominately the capacitive type and includes a capacitive tuning plate 22 as of semi-cylindrical shape symmetrically disposed in the cavity 4 lengthwise thereof and arranged for rectilinear translation radially thereof for varying the capacity across the gap of the cavity 4 thereby varying the resonant frequency of the cavity 4. The tuning plate 22 has a semi-cylindrical shape to provide greater tuner area in close proximity to the re-entrant portions 20 of the drift tubes 19. The tuner plate 22 is carried from a conductive metallic block member 23 as by brazing. The block 23 is, in turn, connected to a radially outwardly directed threaded tuner stem 24. The tuner assembly 21 is vacuum sealed to the envelope 1 of the tube via the intermediary of a flexible hollow cylindrical metallic bellows 25 as of, for example, stainless steel. The bellows 25 is sealed at its ends respectively to the conductive block 23 and a hollow cylindrical tuner adaptor 26 which, in turn, is transversely disposed of and sealed to the cylindrical member 16 as by, for example, welding. A flanged hollow cylindrical tuner guide sleeve 27 is coaxially disposed of the tuner stem 24 and is provided with an internal bearing surface at its innermost extremity for bearing against the tuner stem 24 to assure proper alignment of the tuner plate 22. The flanged portion of the tuner guide sleeve 27 is fixedly mounted from the tuner adaptor 26 as by screws, not shown. The flange portion of the tuner guide sleeve 27 has diametrically milled channels to receive therewithin a coolant tube 29 which has a portion of its length wound into a bifilar helix which is disposed coaxially of the tuner guide sleeve 27 and fixedly secured as by brazing at its innermost extremity to the tuner block 23 for cooling of the tuner plate 22, in use.

A cylindrical tuner drive nut 31 provided with an outwardly directed flange at one end is coaxially disposed of the threaded tuner stem 24 and serves to drive the tuner plate 22 in a rectilinear manner by mating with the threads of the tuner stem 24. The tuner drive nut 31 bears at its flanged portion upon the similar flanged portion of the tuner guide sleeve 27 thereby capturing the nut against inward translation thereof. The atmospheric pressure exerts an inwardly directed force on the tuner drive stem 24 through the intermediary of the bellows 25, tuner block 23 and tuner stem 24 and thereby serves to bias the tuner drive stem inwardly of the cavity for preventing the tuner drive nut 31 from backing off of the tuner drive stem 24. Rotation of the tuner drive nut 31 is effected by a tool, not shown, inserted through an aligned opening 32 in the beam focus solenoid 5.

In another embodiment of the present invention (see FIG. 1a) the midsection of the tubular envelope 1 is made up of a plurality of modular elements of two kinds. More specifically, a first tuner modular assembly 33 includes a hollow cylindrical member 34 as of, for example, stainless steel and is provided with outwardly directed flange member 35 at the open ends thereof. The tuner module 33 is apertured to receive a tuner assembly 21 as previously described.

A second kind of module is a drift tube module 36 and includes a hollow cylindrical envelope member 37, as of, for example, stainless steel provided with outwardly directed flanges 38 at the open ends thereof. Two annular cavity headers 39 are carried transversely of and spaced longitudinally apart within the cylindrical member 37. A hollow cylindrical drift tube segment 41 is carried axially of and transversely of the cavity headers 39. A coolant tube 42 as of, for example, copper is wound around the midsection of the drift tube 41 between the headers 39 and enters and leaves the module 36 through openings suitably provided in the cylindrical member 37. The midsection of tube envelope 1 is constructed of a plurality of tuner modules 33 and drift tube modules 36 alternately sealed together at the mating flanges 35 and 38 respectively as by, for example, welding. Successive cavity resonators 4 are defined by the interior spaces between successive drift tube modules 36 and are circumscribed by the tuner modules 33.

The above described two kinds of modular envelope construction provide a tube structure which is extremely rugged due to the strength of the welded tubular members. In addition, the modular structure is easy to build as the number of brazes that have heretofore been utilized for constructing such a tube are greatly minimized thereby substantially decreasing the possibility of incurring vacuum leaks in the envelope 1. In addition, this type of structure facilitates replacement of defective parts since the defective module need only be removed and replaced by a new module.

Referring now to FIGS. 1, 2 and 3 there is shown the horizontal tube mounting feature of the present invention. More specifically, the beam focus solenoid 5 includes an outer hollow cylindrical shell 45 as of, for example, steel. The shell 45 forms the yoke of the beam focus solenoid 5 and is made up of an upper and a lower semi-cylindrical member. The lower semi-cylindrical yoke member forms a cradle for the beam focus solenoid and is supported from the floor in a horizontal position by stanchions 46.

Two tracks 47 are disposed longitudinally of the beam focus solenoid 5 along the inside surface thereof and are separated by approximately 60° of arc. The tracks 47 are supported from the lower semi-cylindrical yoke member 45 via the intermediary of a plurality of tracks support members 50 as of, for example, stainless steel spaced apart at intervals along the tracks 47.

Three pairs of wheels 48 as of, for example, stainless steel are each carried from a suitable yoke assembly 49 which, in turn, is secured to the tube's vacuum envelope 1 at spaced apart longitudinal positions via the intermediary of clamping collars 51. The wheels 48 ride within the U-shaped track 47 such that the relatively heavy tube may be easily rolled in and out of the beam focusing solenoid 5.

Horizontal mounting of the tube on wheels 48 within the focus solenoid 5 permits easy access to the tube for replacement thereof or for adjustment of the tuners 21, as desired. It can be seen that if the tube were turned up on its end and vertically mounted in the solenoid 5, as is customary in this art, that access to the tube which is nine to eleven feet long becomes difficult. Moreover, the prior art vertical mounting requires the ceiling of the building to be very high in order to accommodate the lifting cranes and to permit telescoping of the tube within the solenoid 5.

The midsection X-ray shielding feature can be seen by reference to FIGS. 1, 2 and 7 and forms the subject matter of a co-pending divisional application U.S. Serial No. 218,071, filed August 20, 1962 and assigned to the same assignee as the present invention. More specifically, the tube of the present invention operates with a D.C. beam voltage of approximately 150 kv. such that 150 kv. X-rays can be expected from beam interception on the drift tube segments 19 throughout the midsection of the tube. In order to protect operating personnel from these dangerous X-rays, a cylindrical X-ray shield 53 has been disposed circumscribing the midsection of the envelope 1 around the inside periphery of the beam focusing solenoid 5.

The X-ray shield 53 is made up of a plurality of hollow cylindrical members as of lead having a thickness of approximately ⅜ of an inch. The tracks 47 are not laid directly on the lead shield but, as previously pointed out, are supported from suitable support members 50 spaced at intervals along the track 47 and extending through the lead shield and solenoid 5 for support from the lower half of the semi-cylindrical yoke 45.

By disposing the X-ray shield 53 between the tube and the solenoid 5 and closely spaced to the tube, the total weight of the lead shield is greatly minimized since the mean radius of the shield is minimized and since a certain thickness of lead is required whether the shield be disposed at a substantial distance or closely spaced to the source of the X-rays. In addition, by disposing the X-ray shield 53 between the tube and the coils of the solenoid 5, the insulation on the electrical coils making up the focusing solenoid 5 is shielded from the X-rays thereby decreasing the tendency for the insulating material to be damaged by prolonged X-ray bombardment. The solenoid 5 consists of two sets of hollow cylindrical concentrically disposed conducting coils 54 separated by a hollow metallic cylinder 55 as of, for example, copper, the coils being wound on a hollow cylinder 56 as of, for example, aluminum and being outwardly and inwardly surrounded by cylindrical shell 45 and X-ray shielding 53, respectively.

Referring now to FIGS. 4, 5 and 6 there is shown the novel cathode feature of the present invention. More specifically, a concave thermionic electron emitter button 61 is heated from its backside via a radiant heater including an incandescent double spiral wound helical element 62 carried from a conical refractory metallic heater base member 63 as of, for example, molybdenum via the intermediary of radially disposed refractory insulator assemblies 64.

The insulator assembly 64 includes a lower support rod member 60 as of, for example, alumina ceramic notched at 65 to receive therewithin the helical heating element 62. The lower insulating support rod member 60 is tightly held against the heater base member 63 via the intermediary of a plurality of refractory wires 66, as of molybdenum, laced over the heater support member 60 and extending through suitable openings in the heater base member 63 and twisted together at their free ends behind the heater base member 63.

A refractory insulating cover member 67 covers over the notches 65 and heater element 62 to hold the heating element 62 within the notches 65 in the heater insulating support member 60. The insulator cover member 67 is firmly held in place via a plurality of refractory wires 68 as of, for example, molybdenum laced over the cover member 67 and lower member 60 and extending through openings in the heater base member 63 and being twisted together at the free ends thereof.

Since the incandescent heater element 62 is held in spaced apart relation from the conical heater base member 63, heat is not readily conducted away from the heater element 62 whereby more efficient utilization of the heating element is obtained. In addition, due to the helical winding of the heating element 62 and the circumferal spacing of the insulator assemblies 64, sagging of the hot heater element 62 in use is minimized.

The conical heater base plate 63 is supported from the base of the tube via the intermediary of a first hollow cylindrical cathode support member 71 as of, for example, stainless steel, via the intermediary of a second hollow cylindrical heater support member 72 as of, for example, molybdenum connected to the first cylindrical support 71 via the intermediary of a transversely disposed mounting flange 73 carried at the end of the cylindrical cathode support member 71. The second cylindrical heater support member 72 is provided with a flange at the end thereof for being connected to the mounting flange 73 via the intermediary of a plurality of screws 74 spaced about the periphery of the flanged portion of the second cylindrical heater support member 72 and being threaded into tapped holes in flange 73, the heads of the screws being disposed toward the heater thereby shielding the screw heads from the high voltage fields between the cathode and anode.

Current is supplied to the incandescent heating element 62 via two heater supply leads 75 carried within the first cylindrical hollow cathode support 71 and passing transversely through the second cylindrical heater support 72 via suitable apertures therein.

The cathode emitter button 61 is provided with a hollow cylindrical skirt 76 suitably apertured about the periphery of the free end thereof for mounting from the mounting flange 73 via the intermediary of a plurality of screws 77 threaded into tapped radially directed holes in the mounting flange 73. The heads of the screws 77 are shielded from the high voltage fields in the cathode region via the intermediary of a cathode focus electrode 79 which is carried from the mounting flange 73 via the intermediary of a plurality of screws 81 threaded into tapped holes in the mounting flange 73. The heads of the screws 81 are shielded from the high intensity electric fields in the vicinity of the cathode by the large radius protruding portion 82 of the cathode focus electrode 79.

The cathode assembly 2 including the self-shielding cathode focus electrode 79 offers a greatly simplified cathode construction since the parts may be readily replaced by merely removing certain screws 74, 77 and 81 and inserting the new or repaired part. Heretofore these cathode assemblies have been brazed or welded together such that replacement of parts was very difficult if not impossible.

Referring now to FIGS. 1, 8 and 9 there is shown the lightweight high thermal capacity collector feature which forms the subject matter of a co-pending divisional application U.S. Serial No. 218,071, filed August 20, 1962 and assigned to the same assignee as the present invention. More specifically, a relatively thin wall hollow cylindrical collector bucket 91 is closed off at the far end thereof via a relatively thin transverse wall 92. The collector bucket 91 is adapted to receive the beam therein over the interior side walls thereof for dissipating the kinetic energies of the electrons. The collector bucket 91 including the end wall 92 is made of a good thermal conducting material as, for example, copper. The exterior of the collector bucket is provided with a plurality of relatively shallow channels 93 as of .100" deep milled therein (see FIG. 9).

The channels 93 are arranged such that there is a set of four parallel directed channels extending around the collector bucket 91 as indicated by the arrows. More specifically, four parallel channels pass longitudinally along one side of the bucket from the closed end thereof substantially to the open end thereof, thence circumferally through approximately 90° of arc, thence passing longitudinally back to the closed end and diametrically across the closed end of the bucket and back longitudinally along the side of the bucket substantially to the open end thereof, thence circumferally through approximately 90° of arc and thence longitudinally along side of the bucket to the closed end thereof. A plurality of parallel channels are employed to minimize turbulence in the flow of coolant.

The outside periphery of the channeled bucket 91 (see FIG. 8) is surrounded by a tightly fitting collector sleeve 94 thereby defining the coolant channels 93 between the milled out portions of the collector bucket 91 and the collector sleeve 94. The milled end wall 92 of the collector 91 is covered over by a cover plate 95 (see FIG. 8) having diametrically opposed slots cut in the outside periphery thereof for allowing coolant to communicate with the set of four parallel channels directed longitudinally of the collector bucket 91.

A centrally bored cylindrical block 96 is provided at the open end thereof with an outwardly directed flange 97 for sealing about its periphery to the end of the collector sleeve 94 (see FIG. 8b). The central bore of the cylindrical block 96 is provided with a longitudinally directed septum 98 sealed at one end to cover plate 95 thereby defining a coolant input manifold 99 and output manifold 101. Manifolds 99 and 101 connect to suitable coolant tudes via openings 102 and 103 in the metallic block 96.

The configuration and arrangement of coolant channels 93 on the collector bucket 91 facilitates easy manifolding of the collector as the input and output channels are closely spaced at the same end of the collector. In addition, maximum heat transfer to the flow of the coolant fluid is assured due to the high velocity flow of the coolant as of, for example, water. Moreover, the pattern of channel arrangement allows the close flat end of the collector bucket 91 to be cooled without introducing excessive turbulence in the flow of coolant. Although the particular channel pattern shown includes only 4 longitudinal passes along the collector bucket, the number of such longitudinal passes $N_l$ may be increased in steps of two while increasing the number of transverse end passes $N_t$ in steps of one, the transverse end passes falling on parallel chords of the circular end wall 92. Thus the pattern is defined by the following relationship: $N_l = 2N_t + 2$. The circumferal arc between adjacent parallel channels sets is approximately $360/N_l$ degrees.

The collector bucket 91 is supported from the tube body at the beam entrance thereto via the intermediary of an annular insulator 105 as of, for example, alumina ceramic (see FIG. 8a). The insulator 105 is, in turn, secured within an annular metallic channel 106 as of, for example, copper which is brazed to an annular header 107. The annular head 107 forms one pole piece of the solenoid 5 and is made of a highly magnetic permeable material as of, for example, iron. The iron pole piece 107 is copper plated as it also forms one wall of the output cavity 4.

The other end of the collector bucket 91 (see FIG. 8b) is supported from a coaxially disposed collector support cylinder 108 as of, for example, stainless steel through the intermediaries of annular frame members 109 and annular insulator 111. The other end of the collector support cylinder 108 is fixedly secured to the pole piece 107 as by, for example, welding. Insulators 105 and 111 serve to insulate the collector bucket 91 from the tube body such that the beam interception current on the tube body may be monitored as desired.

A hollow cylindrical chamber 113 defined by the space between the outer surface of the collector support cylinder 108 and an outer concentrically disposed cylinder 114 serves to house a collector X-ray shield 115, as of lead. The cylinder 114 is sealed to the pole piece 107 in a vacuum tight manner as by, for example, welding and forms a portion of the tube vacuum envelope. The X-ray shield 115 is made of a ½" thick lead cylinder which is slidably received within the hollow cylindrical chamber 113 and serves to shield operating personnel and the R.F. window 13 from 300 kv. X-rays generated in the collector bucket 91.

By integrally building the X-ray shield into the collector assembly 3, as described above, a minimum weight of X-ray shielding material is required as the shield is very closely spaced to the outer circumference of the collector bucket 91 within which the X-rays are generated. In addition, by making the X-ray shield 115 easily slidable within the chamber 113, the X-ray shield 115 may be readily removed for shipment of the tube whereby unnecessary shipping costs may be reduced.

The collector assembly 3 is of substantially the same modular construction as the midsection of the tube and is fixed to the midsection of the tube via the intermediary of an outer tubular member 117 provided with outwardly directed flanges 118 at both ends thereof. One flange 118 is sealed to the mating flange 17 of the last midsection module 15 as by welding. The other free end of the outer tubular member 117 is closed off by a transverse annular header 119 as of, for example, stainless steel sealed as by welding between the ends of the cylinder 114 and outer tubular member 117, thereby defining a cylindrical chamber between the two cylindrical members 114 and 117 (see FIGS. 10 and 13). This cylindrical chamber is divided into a 90° sector and a 270° sector respectively via the intermediary of two longitudinally extending partitions 121 as of, by example, stainless steel connected between the pole piece 107 and the annular header 119. The 270° sector (see FIG. 8) defines the wrapped output waveguide 9 and the 90° sector provides a chamber 122 providing an air evacuation passage between the midsection of the tube and a cold cathode discharge getter pump 123 (see FIGS. 1 and 8) connecting into the chamber 122 via the intermediary of tubing 124 and a suitable opening in the transverse header 119. Chamber 122 communicates with the output cavity 4 via the intermediary of a suitable opening 125 in the output magnetic pole piece 107.

Referring now to FIGS. 10 and 13 there is shown a novel broad band low capacitance coupling iris 10 utilized for coupling wave energy from the output cavity 4 to the wrapped-around waveguide 9 in the tunable seven cavity klystron amplifier model of the present invention. This improved iris 10 forms the subject matter of a co-pending divisional application U.S. Serial No. 220,327, filed August 29, 1962 and assigned to the same assignee as the present invention. More specifically, the transverse wall of the output cavity 4 formed by the pole piece 107 is provided with a coupling iris 10 in the form of a portion of an annular slot 127 which subtends approximately 180° of circumferal arc about the longitudinal axis of the tube. The coupling slot 127 is symmetric with respect to a radius extending at an angle of 30° to the vertical to offset the R.F. coupling effect of the tuner assembly 21 primarily due to the capacitive tuning plate 22. The central portion of the coupling slot 127 is enlarged radially outwardly at 128 thereby decreasing the capacitive susceptance of the iris 10 as compared to the capacitive susceptance of a coupling iris having a uniform height.

Decreasing the capacitive susceptance of the iris 10 not only raises its resonant frequency but tends to decrease the Q of the coupling iris 10 whereby greater bandwidth may be obtained. In this particular tunable tube model of the present invention it was desirable to have a broadband coupling iris coupling the output cavity 4 to the load. Moreover, it was desirable that this coupling iris have an increasing coupling effect with increasing frequency to compensate for decreasing interaction between the output cavity 4 and the beam with increasing frequency whereby uniform R.F. coupling to the load could be obtained over a wider band of frequencies. Therefore, the resonant frequency $f_1$ of the iris 10 was selected slightly higher than the tunable range of the tube (see FIG. 11), the resonant frequency of the output cavity 4 being tunable over the 12% band and the resonant frequency of the cavity 4 being $f_0$.

In other applications it may be desirable to provide an output iris 10 with a decreasing coupling coefficient with increasing frequency in which case the resonant frequency $f_1$ of the broadband iris 10 would be selected slightly lower than the tunable range of the tube. In the particular seven cavity tunable klystron model of the present invention, the output coupling iris 127 provided the desired coupling characteristic for the output cavity over a 12% bandwidth while passing 10 megawatts peak and 30 kw. average power. In a particular exemplary coupling iris 10 the pole piece 107 was approximately one inch thick, the height of the narrow slot portion 127 of the iris 10 was approximately one inch and the height of the central large portion 128 of the iris 10 was approximately 2.6". The iris 10 fed the output waveguide 9 having a mean radius of approximately five inches and a height of approximately 2.6".

The wrapped around output waveguide 9, as shown in FIGS. 1, 10, 12 and 13, is a very important feature as it provides means for extraction of very high R.F. power from the output cavity 4 without the necessity of bringing the waveguide out through a break in the beam focus solenoid 5. This output wave guide forms the subject matter of a co-pending divisional application U.S. Serial No. 220,325, filed August 29, 1962 and assigned to the same assignee as the present invention. In this manner the beam focus solenoid 5 may extend up to and around the output cavity 4 thereby providing beam focusing in the output cavity 4 where it is most needed.

The R.F. output circuit for the tunable seven cavity klystron amplifier model of the present invention is shown in FIGS. 12 and 13. The waveguide portion of this output circuit including waveguide 9, coaxial line 11, doorknob transition 12 and output waveguide 14 are impedance matched such that the aforementioned waveguide sections from plane A—A to the rectangular output waveguide 14 provide a reflectionless transmission line over the entire 12% tuning range of the tube.

The reflectionless matching is obtained by two broad band waveguide transitions. The first of these transitions is from the output waveguide 9 to the coaxial line 11. This transition is matched over the desired frequency band by saddle 131 of semi-cylindrical shape and made of a good conducting material as of, for example, copper. The saddle 131 is fixedly secured to the outer periphery of cylinder 114 which forms the bottom wall of the waveguide 9. The capacitive discontinuity produced by the saddle 131 is balanced by an inductive discontinuity formed by the shorted length of waveguide 9 between the coaxial transmission line 11 and the annular header 119. Typical dimensions for an examplary first transition at U.H.F. frequencies are: ten inches from the center of the coupling iris 10 to the center line of the coaxial transmission line 11, approximately four inches from the pole piece 107 to the beginning portion of the saddle 131, ten inches for the length of the saddle, approximately 0.6" for the height of the saddle 131, and approximately five inches for the length of the shorted section of waveguide between the innersection of the coaxial line 11 and shorting header 119. In this particular example the coaxial line 11 outer conductor had an inner diameter of approximately eight and one half inches and the inner conductor had an outer diameter of approximately 3.6".

The coaxial line 11 is matched to the output waveguide 14 via the intermediary of the second R.F. transition or doorknob transition 12.

The incorporation of the cylindrical R.F. window 13 into the doorknob transistion 12 forms the subject matter of a co-pending divisional application U.S. Serial No. 220,325, filed August 29, 1962 and assigned to the same assignee as the present invention. More specifically (see FIG. 12a) the cylindrical R.F. window 13 as of, for example, alumina ceramic eight inches in diameter, six inches in length and ¼" thick, is sealed in a vacuum tight manner at its ends via annular thin walled frame members 133 as of, for example, kovar. The annular frame members 133 are provided with inwardly directed flanges which are sandwich brazed between two segments of the ceramic window 13 whereby the shear forces produced by unequal thermal expansion between the kovar and the alumina ceramic are equally divided between both sides of the sealed inwardly directed flange portion of the frame 133. Annular frame member 133 spaced closest to the collector assembly 3 is provided with an outwardly directed flange portion sealed about its periphery as by welding to a similar outwardly directed mating flange member 134 carried from the outer conductor of the coaxial line 11. A coaxial line to waveguide adaptor 135 is clamped over the mating flanges 133 and 134 and is connected at its other end to the output waveguide 14 as by a plurality of screws.

The waveguide adaptor 135 is provided with a recess 136 at its inner periphery for carrying therewithin a helical wound silver plated beryllium copper spring 136 having an outside diameter slightly larger than the depth of the recess, the protruding portion of the spring 137 riding in slidable engagement with the outside surface of the window frame 133 whereby good electrical contact is assured therebetween. This slidable R.F. contact between the waveguide adaptor 135 and the R.F. window frame 133 assures a good electrical connection between the waveguide 14 and the coaxial line 11 while permitting relative movement of the window 13 and the waveguides 14 and 11 to allow for thermal expansion and contraction of the R.F. window and frame members, in use and to prevent undue thermal stresses being placed upon the window 13.

Similarly, the inner circumference of a doorknob 130 is recessed at 138 to receive a helical silver plated beryllium copper spring 139 which makes good electrical contact with the annular window frame member 133. The annular window frame member 133 most remote from the collector assembly 3 is vacuum sealed to the inner conductor of the coaxial line 11 via the intermediary of a thin wall annular channel 141 and flanged annular header 142, as of, for example, stainless steel. The header 142 is brazed to the copper inner conductor of the coaxial line 11 and provided with outwardly directed flange member 143 for vacuum sealing to the mating channel 141 as by welding.

The provision of the cylindrical R.F. window 13 in the doorknob transition 12 allows a relatively large area of window to be utilized whereby very high average power may be passed therethrough without producing local overheating in use. Moreover, disposing the R.F. window 13 in the doorknob transition 12 removes the window from the area of the output gap in the output resonator 4 whereby the window is not exposed to bombardment by secondary electrons generated in the output cavity, and thus charging of the output window 13 by secondary electron emission is prevented in use.

It has been found that a reflectionless R.F. output circuit constructed as described above allows very large peak power as of, for example, 10 megawatts and substantial average power as of, for example, 30 killowatts to be passed therethrough over a 12% bandwidth without producing electrical breakdown of the window and other harmful results.

Referring now to FIGS. 14 and 15 there is shown a broad band R.F. output circuit utilized with the five cavity fixed tuned broad band klystron amplifier model of the present invention. This broad band R.F. circuit is similar in many respects to the previously described R.F. output circuit as utilized with the seven cavity tunable model. Therefore only the differences between this model and the previously described model will be pointed out in detail. In particular, the output R.F. circuit is not a reflectionless waveguide from the output iris 10 to the load, but instead discontinuities are arranged within the waveguide 9 and doorknob transition 12 to produce reflections such that these output waveguide sections act as a cavity resonator which is coupled to the output resonator 4 via the intermediary of a capacitive loaded resonant coupling iris 147 in the collector pole piece 107. This multi-resonant output circuit forms the subject matter of a co-pending divisional application U.S. Serial No. 220,325 filed August 29, 1962 and assigned to the same assignee as the present invention.

The capacitive loaded coupling iris 147 is shown in FIG. 15 and has a height substantially equal to the height of the waveguide 9 and circumferally subtends an arc of approximately the full 270° of the waveguide 9. The iris 147 is provided with a capacitive loading slug member 148 centrally of the iris 147 to provide a relatively high Q coupling circuit for coupling the output cavity 4 to the resonant output waveguide 9.

The output waveguide 9 is made resonant by the provision of a first discontinuity at the intersection of the coaxial line 11 and the waveguide 9. It will be noted that the matching saddle 131 which had previously been used in the other R.F. output circuit has been left out in this output circuit to form the first waveguide to coaxial line discontinuity. The effect of this discontinuity is further enhanced by selection of the proper spacing between the junction of the coaxial line 11 and the shorted waveguide 9. For example, it can be seen that the section of shorted waveguide defined by the distance from the junction of the coaxial line 11 to the shorting header 119 is substantially less in this R.F. circuit design. As a typical example of dimensions utilized in the present resonant section of waveguide 9, the distance from the pole piece 107 to the center line of the coaxial line 11 was approximately eighteen inches and the distance from the center line of the coaxial line 11 to the shorting header 119 was approximately 5.7". In both tube models the transverse dimensions of the waveguide 9 and coaxial line 11 are the same.

A second waveguide discontinuity serving to form the resonant section of waveguide 9 is the provision of an inductive iris 149 disposed in the vicinity of the doorknob transition 12. In this case, the inductive iris 149 comprises two conducting partitions extending from the top to the bottom of the waveguide 14 and extending inwardly of the waveguide approximately 2.2".

The effect of the inductive iris 149, mismatch of the transition from the coaxial line 11 to the waveguide 9, and the provision of the relatively high Q coupling iris 147 closely coupled to the output cavity 4, is to produce a triple tuned R.F. resonant output circuit having a relatively broad bandwidth, in excess of 16%, as can be seen by the graph shown in FIG. 16.

The five cavity fixed tuned broad band klystron amplifier model of the present invention utilizes a novel cavity tuning and loading method for obtaining enhanced bandwidth. The method constitutes the subject matter of a co-pending divisional application U.S. Serial No. 220,326, filed August 29, 1962 and assigned to the same assignee as the present invention. More specifically, referring now to FIG. 17, there is shown in schematic diagram form a five cavity klystron amplifier tube having four driving cavities 161, 162, 163 and 164. An output R.F. circuit 165, preferably of the coupled cavity type as shown in FIG. 14, serves to present a flat impedance at the output gap to the beam over the desired frequency band. In particular, the broadbanding method relates to the driver section and has to do with the proper selection of resonant frequencies and loaded Q's for the individual driving cavities.

It has been found that, in general, to obtain broad band response the poles of the driving cavities in the complex frequency plane should preferably lie in certain predetermined positions. Analysis of multicavity klystron amplifiers utilizing a complex frequency plane is taught in the following article: "A Study of the Broadband Frequency Response of the Multicavity Klystron Amplifier," by K. H. Kreuchen, B. A. Auld and N. E. Dixon in Journal of Electronics, vol. 2, pp. 529–567 (1957). If no zeros were present in the klystron response, then these poles should lie on a Tchebycheff ellipse. In practice, zeros will be found in the response, and therefore to counteract the effect of the zeros, the poles should be displaced from the ellipse in a certain manner as follows.

It has been found that with multicavity klystrons the best broad band results are obtained when the Q's and frequency of the cavities are arranged, starting from the lowest frequency cavity, with the loaded Q decreasing for each cavity successively higher in frequency until about the center of the frequency band after which the loaded Q increase gradually, the highest frequency cavity having the highest Q. The exact positions of the poles may be computed using the small-signal space-charged-wave theory as taught by Kruchen, Auld and Dixon in the above article.

A preferred distribution of loaded cavity Q versus frequency is indicated in FIG. 18, where letters A–E refer to individual driving cavities. Merely arranging the loaded Q's of the cavities with regard to frequency as indicated in FIG. 18 will provide a substantial increase in the bandwidth of the tube. However, even greater enhancement in the bandwidth may be obtained if the cavities are related to the poles in a certain manner. More specifically, it has been found that the bandwidth of a multicavity klystron utilizing short drift lengths between cavities as of, for example, less than 60° of reduced plasma frequency phase as defined by G. M. Branch et al. in General Electric Research Laboratory Report No. 55–RL–1181A, February 1955, can be increased if the input cavity 161 is chosen at the lowest frequency. Furthermore, it has been found that the efficiency of the klystron is substantially improved if the one or two cavities immediately preceding the output cavity are tuned to the high frequency end of the band. Since one of the intermediary cavities preferably has a very low Q as of, for example, 25 the problem of selecting the cavity tunings is uniquely determined for a four cavity driver. Loading a cavity to a very low Q for this application is best accomplished by beam loading, i.e., making the gap length in the order of 1 to 3 radians of electronic drift angle at the operating frequency of the tube. If additional loading is desired, it may be obtained by coupling an additional external load 166 to the cavity as indicated by loop 167 in FIG. 17.

In particular, the second cavity 162 is preferably chosen as the lowest Q cavity because external loading is more easily accomplished near the input cavity where the R.F. power is relatively low. The input cavity 161 is preferably tuned to the low end of the band to increase the bandwidth. The last one or two cavities 163 and 164 are preferably tuned to the high frequency end of the band to enhance efficiency. Generally, cavities with the lowest Q should be nearer to the input cavity. Thus for a five cavity klystron amplifier having four driving cavities, the preferred tuning arrangement is that the resonance frequency of the cavities should increase successively from the first cavity to the last driving cavity.

The five cavity fixed tuned tube model of the present invention having loaded Q's as indicated in FIG. 17 and resonant frequencies of the cavities as indicated by the arrows in FIG. 19 yielded the small signal gain in db versus frequency deviation curve as plotted in FIG. 19 and the large signal efficiency in percent versus frequency deviation curve as plotted in FIG. 20. From these curves it is easily seen that a 12% to 14% bandwidth was obtained.

The physical construction of the five cavity fixed tuned tube model of the present invention utilized the midsection tube construction as shown in FIG. 1a, the tuners 21 were used only for initially tuning the cavities to the frequencies as indicated in FIG. 19. The output R.F. circuit is shown in FIGS. 14 and 15. External loading was provided for the second driver cavity as shown in FIG. 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency tube apparatus including, means for producing and directing a beam of charged particles over a predetermined beam path longitudinally of the tube, means for collecting the beam at the terminating end of the beam path, means forming an elongated vacuum envelope structure interposed and interconnecting said beam producing means and said beam collecting means in surrounding spatial relationship to said beam path therebetween, said elongated vacuum envelope being of generally hollow cylindrical form with generally uniform outside dimensions and being composed of a plurality of metallic tubular segments of generally uniform outside transverse dimensions and made of material having greater strength and lower electrical conductivity than copper and joined end to end at gas tight seals therebetween, said gas tight seals being formed by outwardly directed annular mating flange portions carried at the joined ends of adjacent ones of said tubular segments, said flange portions having maximum transverse dimensions greater than the outside transverse dimensions of the immediately adjacent portions of said tubular segments such that said flange portions extend radially outwardly from the exterior surface of said tubular segments, said mating flange portions being sealed together in a gas tight manner, and the inside surfaces of a plurality of said tubular segments defining the inside walls of a plurality of cavity resonators successively spaced apart along the beam path in electromagnetic energy exchanging relationship with the beam passable therethrough, whereby said segmented vacuum envelope forms a composite rigid tube body and vacuum envelope structure having gas tight joints readily accessible from the exterior thereof facilitating repair and replacement of tube elements.

2. The apparatus according to claim 1 wherein a plurality of said tubular metallic envelope segments each include, a transversely disposed inwardly directed annular cavity header, and a tubular metallic drift tube segment carried from said cavity header with its longitudinal axis in substantial alignment with the longitudinal axis of said tubular envelope segment.

3. The apparatus according to claim 1 wherein a plurality of said tubular metallic envelope segments each include a transversely disposed inwardly directed cavity resonator tuning member.

4. The apparatus according to claim 1 wherein a plurality of said tubular metallic envelope segments each include a transversely directed cavity resonator tuning member translatable through said tubular segment via the intermediary of a deformable vacuum seal for effecting tuning of said cavity resonators.

5. The tube apparatus according to claim 1 wherein alternate ones of said tubular segments taken in a direction along the beam path defines a tube body module of a first kind having similar internal structural configuration substantially different from other ones of said tubular segments of said tube body, said last mentioned other ones of said tubular segments defining tube body modules of a second kind having similar internal structural configuration and being sandwiched between said tube body modules of said first kind, whereby said elongated composite tube body is substantially entirely formed by a stacked array of modules of said first and second kinds.

6. The tube apparatus according to claim 1 wherein the material of said tubular envelope segments is stainless steel and wherein said gas-tight seals are provided by welded joints running around the outer periphery of said mating flange portions.

7. A high frequency tube apparatus including, means for producing and directing a beam of charged particles over a predetermined path longitudinally of the tube, means for collecting the beam at the terminating end of the beam path, means disposed in space displaced repetitions along said beam path for producing successive electromagnetic interaction with the beam and for extracting high frequency wave energy from said beam, an elongated vacuum tight envelope enclosing the beam path, an elongated tubular beam focus solenoid adapted to surround said vacuum envelope for focusing the beam, said solenoid being mounted with its longitudinal axis substantially in the horizontal plane, and wheel structure wheel means disposed in between said solenoid and said envelope at longitudinally spaced points along the longitudinal axis of said solenoid and envelope for rolling said vacuum envelope into said solenoid from one end thereof whereby handling of the tube is facilitated.

8. The apparatus according to claim 7 including a track means mating in cooperative engagement with said wheel means and said track means being longitudinally directed of and carried from one of said solenoid and tube envelope means, and said wheel means being carried from the other one of said solenoid and tube envelope means.

9. A high frequency tube apparatus including, means for producing and directing a beam of charged particles over a predetermined path longitudinally of the tube, means for collecting the beam at the terminating end of the beam path, means disposed in space displaced repetition along said beam path for producing successive electromagnetic interaction with the beam and for extracting high frequency wave energy from said beam, an elongated metallic vacuum tight envelope enclosing the beam path, an elongated tubular beam focus solenoid adapted to surround said vacuum envelope for focusing the beam, and a hollow cylindrical metallic lead X-ray shield disposed circumscribing said elongated tubular metallic envelope between said envelope and said beam focus solenoid whereby the weight of said X-ray shield is minimized.

10. A high frequency tube apparatus including, an anode structure, a thermionic emitter surrounded by said anode and disposed for producing and directing a beam of charged particles over a predetermined path longitudinally of the tube, means for collecting the beam at the terminating end of the beam path, means disposed in space displaced repetition, along said beam path for producing successive electromagnetic interaction with the beam and for extracting high frequency wave energy from said beam, a vacuum tight envelope enclosing the beam path, and a focus electrode surrounding said emitter between said emitter and said anode structure for focusing the beam of charged particles emitted from said emitter, said focus electrode having an axially directed re-entrant portion, and a plurality of threaded fastener members disposed within said axially re-entrant portion for connecting said emitter to said focus electrode, whereby the re-entrant disposition of said fasteners serves to electrostatically shield said threaded fastening members from the beam accelerating anode potential whereby electrical breakdown within the tube is prevented in use.

References Cited in the file of this patent

UNITED STATES PATENTS

| | | |
|---|---|---|
| 1,905,770 | Walker et al. | Apr. 25, 1933 |
| 2,291,406 | Paehr | July 28, 1942 |
| 2,701,321 | Rich | Feb. 1, 1955 |
| 2,735,033 | Webber | Feb. 14, 1956 |
| 2,774,006 | Field et al. | Dec. 11, 1956 |
| 2,797,353 | Molnar et al. | June 25, 1957 |
| 2,853,642 | Birdsall et al. | Sept. 23, 1958 |
| 2,866,114 | Hardenberg | Dec. 23, 1958 |
| 2,867,746 | Preist | Jan. 6, 1959 |
| 2,871,397 | Preist et al. | Jan. 27, 1959 |
| 2,875,369 | Chambers | Feb. 24, 1959 |
| 2,892,958 | Nygard | June 30, 1959 |
| 2,899,598 | Ginzton | Aug. 11, 1959 |
| 2,934,672 | Pollack et al. | Apr. 26, 1960 |
| 2,939,995 | Danielson | June 7, 1960 |
| 2,944,187 | Walter et al. | July 5, 1960 |
| 2,955,229 | Bondley | Oct. 4, 1960 |
| 2,956,200 | Bates | Oct. 11, 1960 |
| 2,994,009 | Schmidt et al. | July 25, 1961 |

FOREIGN PATENTS

| | | |
|---|---|---|
| 804,463 | Great Britain | Nov. 19, 1958 |

OTHER REFERENCES

Kreuchen et al., Journal of Electronics, vol. 2, No. 6, May 1957, pages 529–567 incl.